(12) United States Patent
Wu et al.

(10) Patent No.: US 6,483,980 B1
(45) Date of Patent: Nov. 19, 2002

(54) HOLDING DEVICE FOR DENSE WAVELENGTH DIVISION MULTIPLEXERS

(75) Inventors: Kun-Tsan Wu, Tu-Chen (TW); Chien-Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/012,005

(22) Filed: Nov. 30, 2001

(51) Int. Cl.[7] ................................................. G02B 6/00
(52) U.S. Cl. ....................................... 385/137; 439/942
(58) Field of Search ............................ 385/137; 439/942

(56) References Cited

U.S. PATENT DOCUMENTS

| | | | |
|---|---|---|---|
| 6,240,236 B1 * | 5/2001 | Daoud | 385/137 |
| 6,249,636 B1 * | 6/2001 | Daoud | 385/137 |
| 6,282,351 B1 * | 8/2001 | Go et al. | 385/137 |
| 6,388,824 B1 * | 5/2002 | Treichler et al. | 385/137 |

* cited by examiner

*Primary Examiner*—Javaid Nasri
(74) *Attorney, Agent, or Firm*—Wei Te Chung

(57) ABSTRACT

A holding device (200) used for a DWDM module. The holding device comprises a base (201), a plurality of projections (209), a plurality of C-shaped grooves (205) interleavingly defined between the projections, and a plurality of C-shaped slots (210) defined in upper portions of the projections respectively. An upper portion of each projection forms two chamfers (211, 212), on opposite sides of the corresponding slot. The chamfers extend inclinedly upwardly in a mutually diverging manner. The upper portion of each projection also forms two opposite slanted faces (207, 208). Two slanted faces of any two projections that oppose each other across an intervening groove extend inclinedly upwardly in a mutually diverging manner. The grooves hold sleeves (101) that enclose DWDMs (100). The slots hold optical fibers (102) of and connecting with the DWDMs.

2 Claims, 5 Drawing Sheets

HOLDING DEVICE FOR DENSE WAVELENGTH DIVISION MULTIPLEXERS

BACKGROUND OF THE INVENTION

1. Field of the Invention

The present invention relates to Dense Wavelength Division Multiplexer (DWDM) modules, and more particularly to a holding device used in a DWDM module for conveniently and reliably holding DWDMs in the DWDM module.

2. Description of Related Art

DWDM systems are widely deployed in modern communications networks. In the DWDM system, multiple channels are carried over a single optical fiber without interference between the channels, so that channel-carrying capacity is increased. The DWDM system includes a DWDM module which secures a plurality of DWDMs therein. DWDMs must be properly secured in the DWDM module, to ensure reliability and durability of the DWDM module. Various means have been developed for securing DWDMs.

One conventional means uses epoxy to secure DWDMs in a DWDM module. Generally, heat must be applied to the epoxy to cure it. This is unduly time-consuming. Furthermore, the heat can alter the dimensions of components in the DWDM, which may adversely affect the optical characteristics of the module. Thus, this means is not favored.

Recently, plastic hooks have been used to fix DWDMs in a DWDM module. The plastic hooks can be secured in short time, and do not affect the optical characteristics of the module. Nevertheless, the plastic hooks are extra components that increase costs.

Thus, an improved means for efficiently and reliably securing DWDMs in a DWDM module is desired.

SUMMARY OF THE INVENTION

Accordingly, an object of the present invention is to provide a holding device which can efficiently and reliably secure DWDMs in a DWDM module.

To achieve the above objects, the present invention provides a holding device used for a DWDM module. The holding device comprises a base, a plurality of projections, a plurality of C-shaped grooves interleavingly defined between the projections, and a plurality of C-shaped slots defined in upper portions of the projections respectively. An upper portion of each projection forms two chamfers, on opposite sides of the corresponding slot. The chamfers extend inclinedly upwardly in a mutually diverging manner. The upper portion of each projection also forms two opposite slanted faces. Two slanted faces of any two projections that oppose each other across an intervening groove extend inclinedly upwardly in a mutually diverging manner. The grooves hold sleeves that enclose DWDMs. The slots hold optical fibers of and connecting with the DWDMs.

Other objects, advantages and novel features of the present invention will be drawn from the following detailed description of preferred embodiments of the present invention with attached drawings, in which:

DETAILED DESCRIPTION OF PREFERRED EMBODIMENTS

Figure 1:
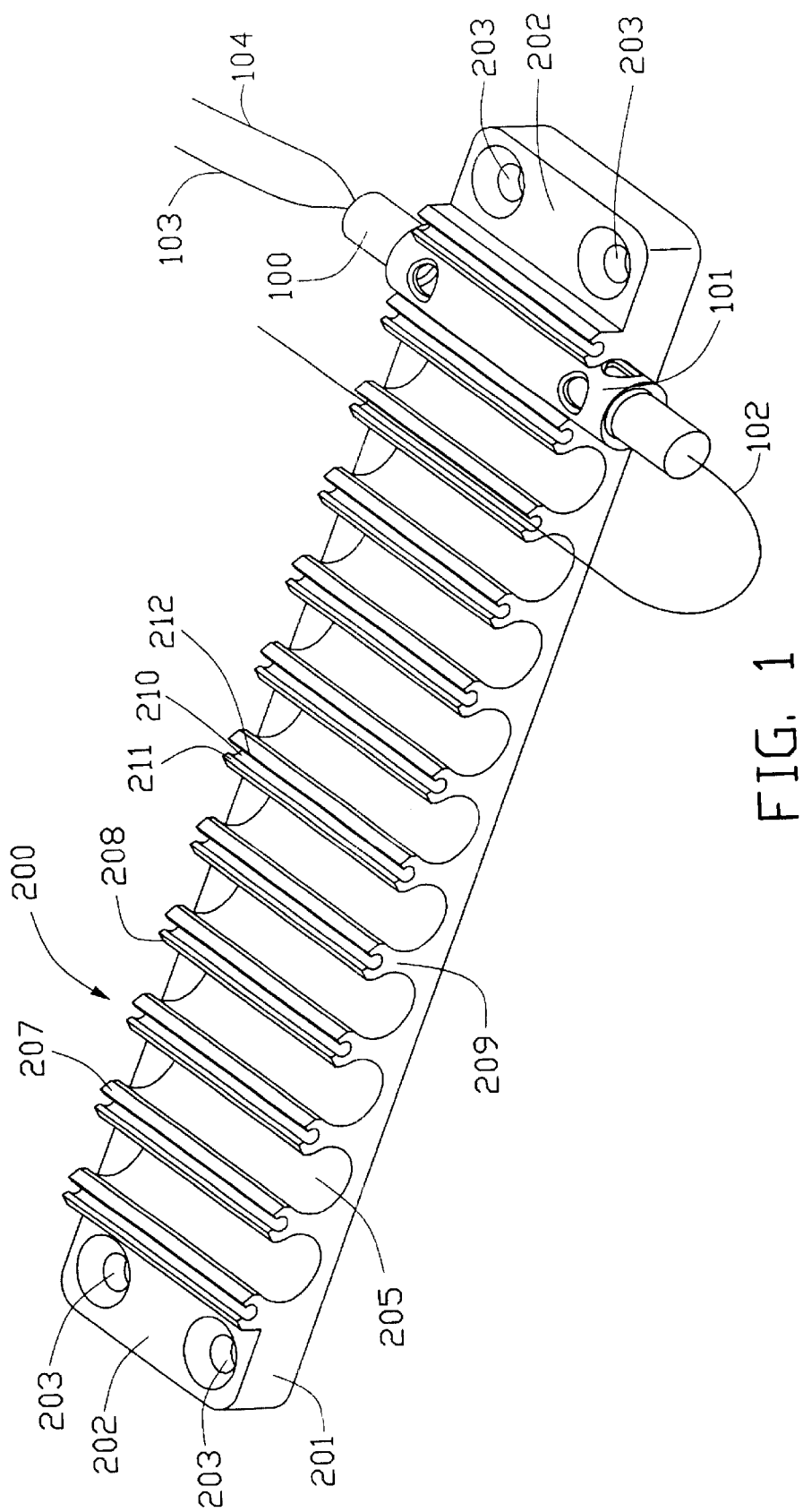
FIG. 1 is a perspective view of a holding device in accordance with a preferred embodiment of the present invention, together with a DWDM secured in the holding device.
Figure 2:
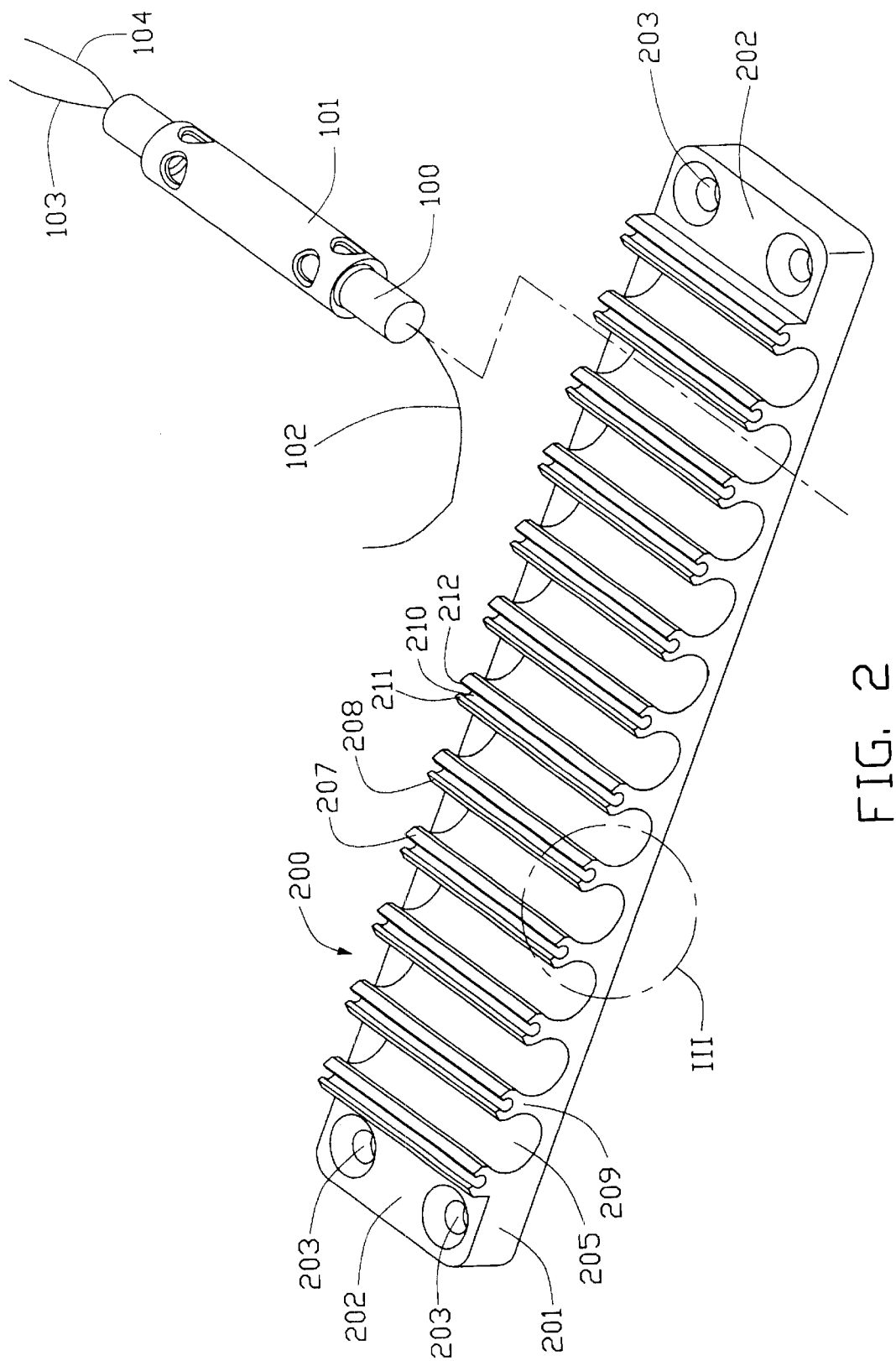
FIG. 2 is similar to FIG. 1, but showing the DWDM ready to be secured in the holding device.

Referring to FIGS. 1 and 2, a holding device 200 in accordance with a preferred embodiment of the present invention is made of elastic material such as plastic or rubber. The holding device 200 comprises a base 201, a plurality of projections 209 extending upwardly from the base 201, a plurality of C-shaped grooves 205 interleavingly defined between the projections 209, and a plurality of C-shaped slots 210 defined in upper portions of the projections 209 respectively. The holding device 200 holds Dense Wavelength Division Multiplexers (DWDMs) 100. Each DWDM 100 is packed in a sleeve 101, and communicates with other optical devices via optical fibers 102, 103 and 104.

The base 201 is generally rectangular. Four holes 203 are defined in four corners of the base 201 respectively, for fixing the base 201 to a frame of a DWDM module (not shown). Each hole 203 has a countersink. Four screws (not shown) are extended through the holes 203 to threadedly engage with the frame of the DWDM module, thereby fixing the holding device 200 in the DWDM module. When the screws are fully engaged with the frame, heads of the screws are located below or flush with a top face 202 of the base 201.

Figure 3:
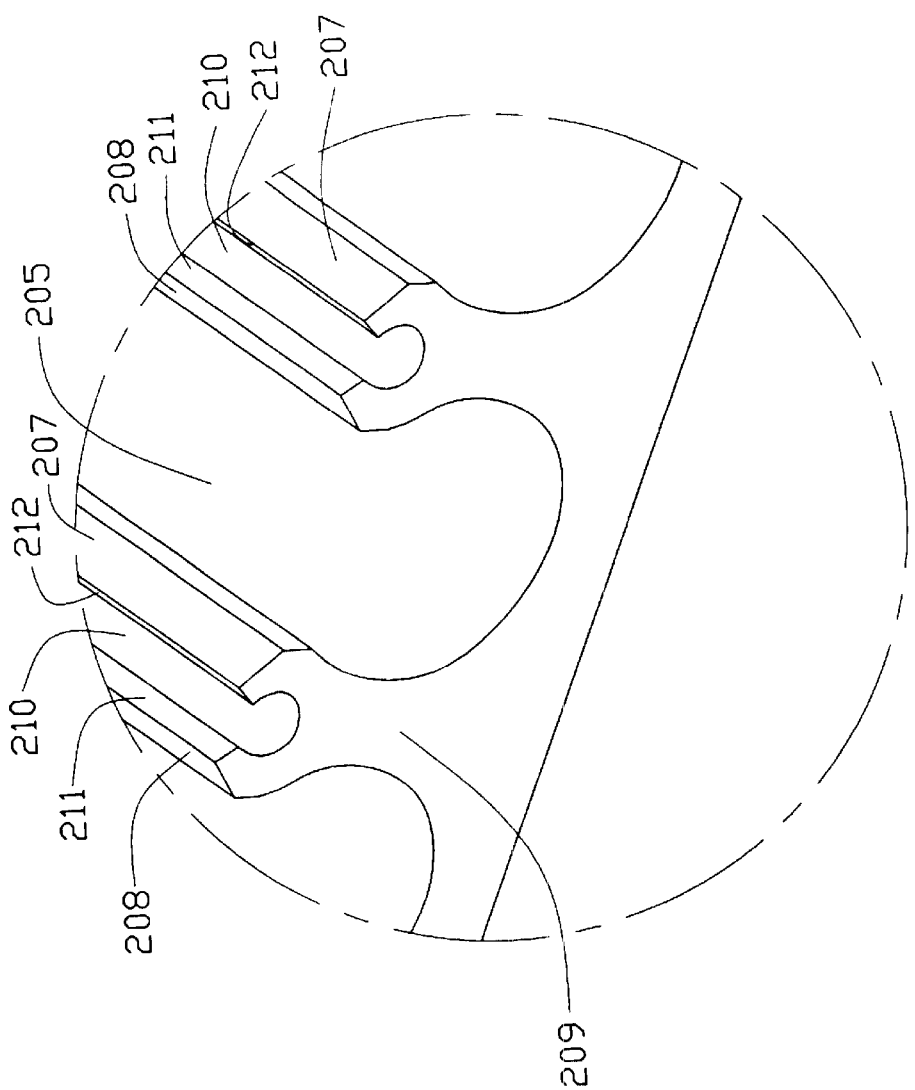
FIG. 3 is an enlarged view of a circled portion III of the holding device of FIG. 2.

Also referring to FIG. 3, the projections 209 are aligned parallel to each other, and evenly spaced apart. Each C-shaped groove 205 is defined between two adjacent projections 209. A main portion of the groove 205 has a generally circular profile, and a top portion of the groove 205 communicates with an exterior of the holding device 200. A diameter of the circular profile is substantially equal to a diameter of the sleeve 101 of each DWDM 100. A width of the top portion is less than the diameter of the circular profile. Accordingly, the groove 205 has an upper inlet (not labeled) narrower than the main portion below the upper inlet. Therefore, any sleeve 101 can be securely retained in the groove 205.

The C-shaped slot 210 of each projection 209 is for retaining optical fibers of and connecting with any DWDM 100, including one or more fibers 102. Each slot 210 is defined between a front face (not labeled) and a rear face (not labeled) of the holding device 200. The slots 210 are aligned parallel to each other and to the grooves 205. Each slot 210 has a configuration similar to a configuration of each groove 205. That is, a top inlet (not labeled) of the slot 210 is narrower than a main portion of the slot 210 below the top inlet, and narrower then a diameter of the any of the corresponding optical fibers including the fibers 102.

The upper portion of each projection 209 further forms chamfers 211, 212 on opposite sides of the corresponding slot 210 respectively. The chamfers 211, 212 extend inclinedly upwardly in a mutually diverging manner, so that any of the corresponding optical fibers including the fibers 102 can be easily guided into the slot 210. The upper portion of each projection 209 further forms slanted faces 207, 208 on opposite sides of the corresponding slot 210 respectively. The slanted faces 207, 208 adjoin topmost extremities of the corresponding chamfers 212, 211 respectively, and extend inclinedly downwardly therefrom respectively. Accordingly, slanted faces 207, 208 on opposite sides of a corresponding groove 205 respectively extended inclinedly upwardly in a mutually diverging manner from the inlet of the groove 205. Therefore, the sleeve 101 of any DWDM 100 can be easily guided into the groove 205.

In use, the sleeve 101 of each DWDM 100 is pressed into the corresponding groove 205 of the holding device 200. The slanted faces 207, 208 on opposite sides of the groove 205 are elastically pushed away from each other, causing the projections 209 on opposite sides of the groove 205 to elastically deform away from each other. Thus, the inlet of the groove 205 is enlarged to allow the sleeve 101 to enter the groove 205. After the sleeve 101 enters the groove 205, the projections 209 elastically return to their original positions to clamp the sleeve 101 in the groove 205. Thereafter, in similar fashion, the optical fibers including the fibers 102 are pressed into the slot 210.

Figure 4:
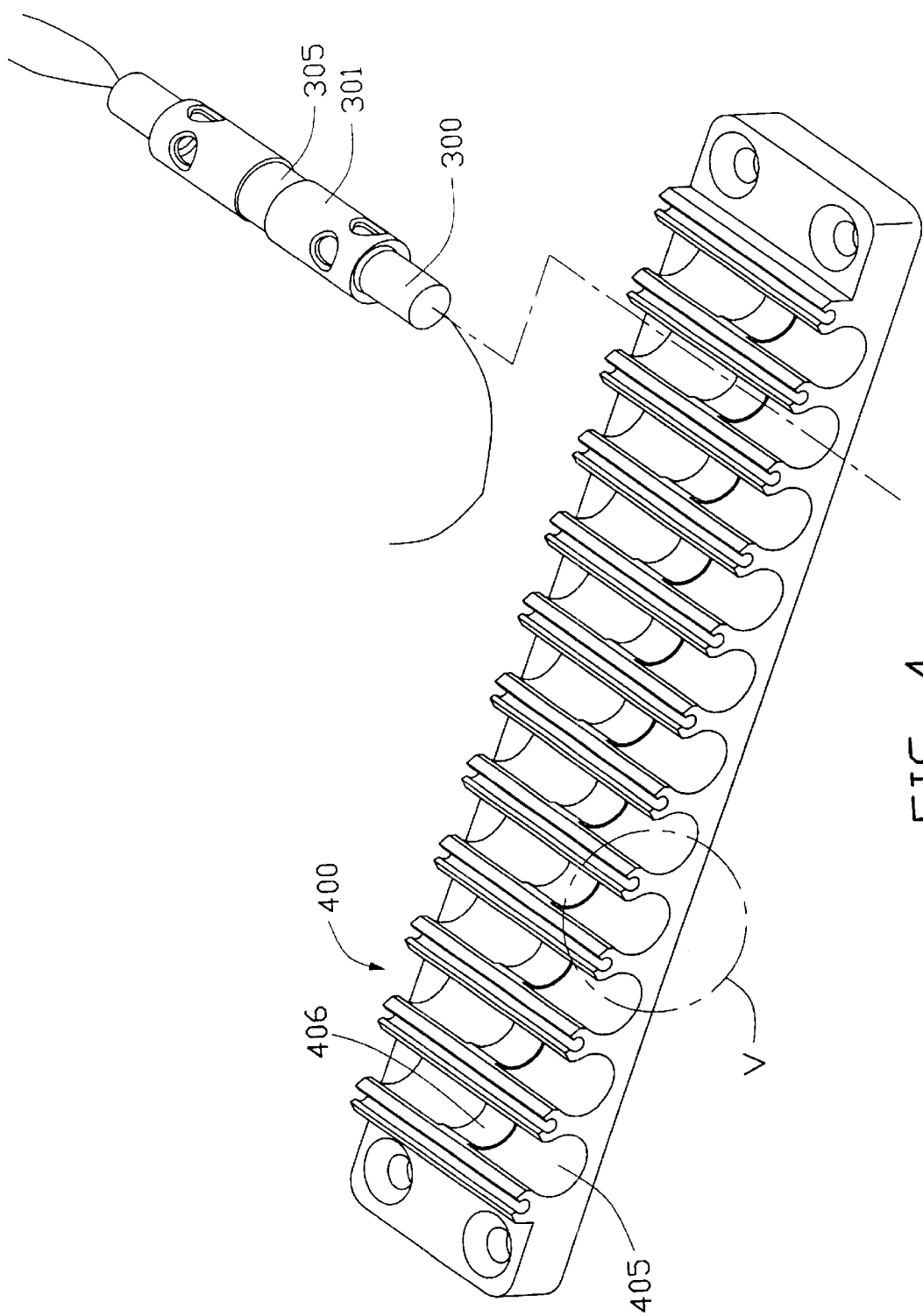
FIG. 4 is a perspective of a holding device in accordance with an alternate embodiment of the present invention, together with a DWDM ready to be secured in the holding device.
Figure 5:
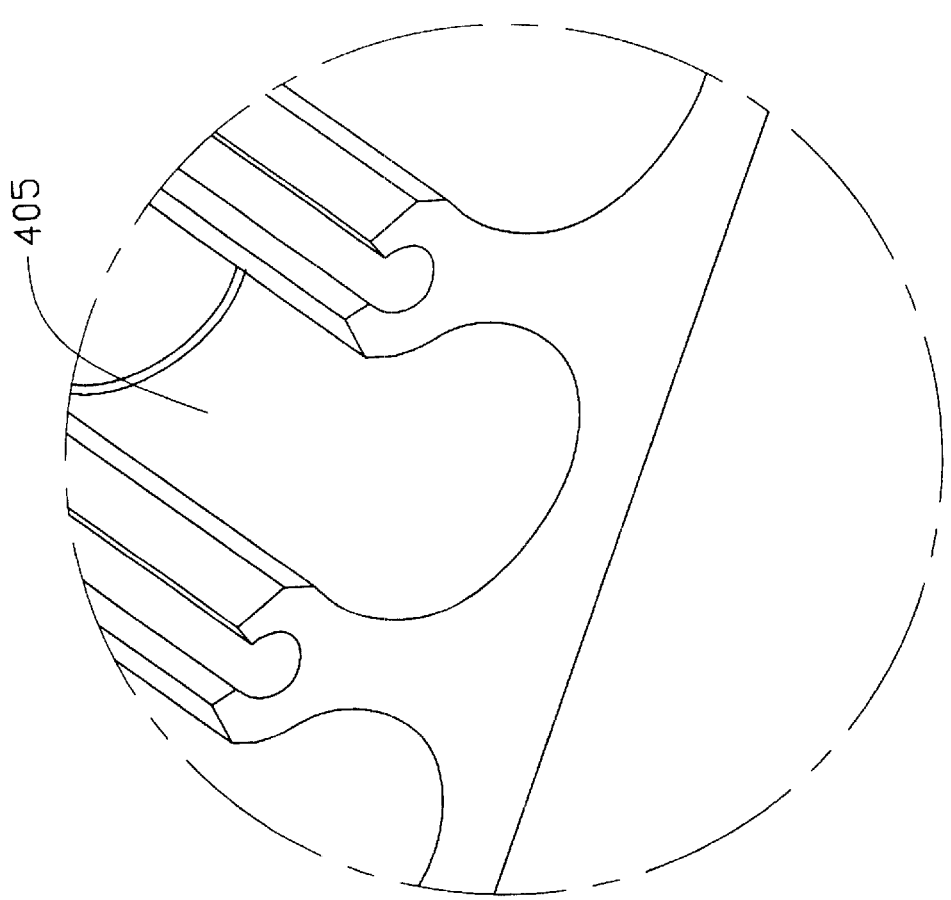
FIG. 5 is an enlarged view of a circled portion V of the holding device of FIG. 4.

FIGS. 4 and 5 show a holding device 400 in accordance with an alternative embodiment of the present invention. The holding device 400 has a structure similar to that of the holding device 200 of the preferred embodiment. However, a C-shaped bead 406 is formed on the holding device 400 in a middle of each C-shaped groove 405. The holding device 400 holds DWDMs 300. A sleeve 301 encloses each DWDM 300. Each sleeve 301 defines an annular recess 305 in a middle portion thereof, for accommodating a corresponding C-shaped bead 406 of the holding device 400.

Use of the holding device 400 is similar to that of the holding device 200 of the preferred embodiment. However, when the sleeve 301 of each DWDM 300 is received in the corresponding groove 405, the bead 406 fits into the recess 305 of the sleeve 301. This prevents the sleeve 301 from moving in longitudinal directions in the groove 405. Thus, the DWDM 300 is reliably secured in the groove 405.

Although the present invention has been described with specific terms, it should be noted that the described embodiments are not necessarily exclusive, and that various changes and modifications may be made thereto without departing from the scope of the present invention as defined in the appended claims.

What is claimed is:

1. A holding device for dense wavelength division multiplexers, the holding device comprising:
 a base;
 a plurality of projections extending upwardly from the base;
 a plurality of grooves defined between the projections; and
 a plurality of sleeves; wherein each of said sleeves enclosing a dense wavelength division multiplexer is fittingly received in the corresponding groove, each of the sleeves being clamped by two corresponding adjacent projections; wherein
  each of the grooves has a generally C-shaped profile; wherein
   each of said projections defines a C-shaped slot in an upper portion thereof for retaining an optical fiber therein; wherein
    the holding device is made of elastic material; wherein
    each of the grooves comprises a portion having a generally circular profile, and a diameter of the circular profile is substantially equal to a diameter of a corresponding sleeve; wherein
    a width of a top portion of each of the grooves is less than the diameter of the circular profile of the groove; wherein
    the upper portion of each of the projections forms two chamfers on opposite sides of a corresponding slot, and the chamfers extend upwardly in a diverging manner; wherein
    an upper portion of each of the projections forms two slanted faces on opposite sides thereof, and the two slanted faces of any two projections that oppose each other across an intervening groove extend upwardly in a diverging manner, the holding device further comprising a C-shaped bead formed in each of the grooves; and wherein each of the sleeves defines a circumferential recess therein for fittingly receiving a corresponding bead of the holding device.

2. A dense wavelength division multiplexer module comprising:
 a plurality of dense wavelength division multiplexers each comprising optical fibers;
 a plurality of sleeves each enclosing a corresponding dense wavelength division multiplexer therein;
 a holding device retaining the sleeves together with the dense wavelength division multiplexers thereon, the holding device comprising:
  a base;
  a plurality of projections extending upwardly from the base;
  a plurality of grooves defined between the projections; wherein the sleeves together with the dense wavelength division multiplexers are fittingly received in the grooves respectively, the sleeves each being clamped by two corresponding adjacent projections; wherein
   each of the grooves has a generally C-shaped profile; wherein
    each of said projections defines a C-shaped slot in an upper portion thereof, retaining the corresponding optical fiber therein; wherein the holding device is made of elastic material; wherein
    each of the grooves comprises a portion having a generally circular profile, and a diameter of the circular profile is substantially equal to a diameter of a corresponding sleeve; wherein
    a width of a top portion of each of the grooves is less than the diameter of the circular profile of the groove; wherein
    an upper portion of each of the projections forms two chamfers on opposite sides of a corresponding slot, and the chamfers extend upwardly in a diverging manner; wherein
    the upper portion of each of the projections forms two slanted faces on opposite sides thereof, and two slanted faces of any two projections that oppose each other across an intervening groove extend upwardly in a diverging manner, the holding device further comprising a C-shaped bead formed in each of the grooves; and wherein each of the sleeves defines a circumferential recess therein fittingly receiving a corresponding bead of the holding device, thereby preventing the sleeves from moving in longitudinal directions in the grooves.

* * * * *